Figure 1:
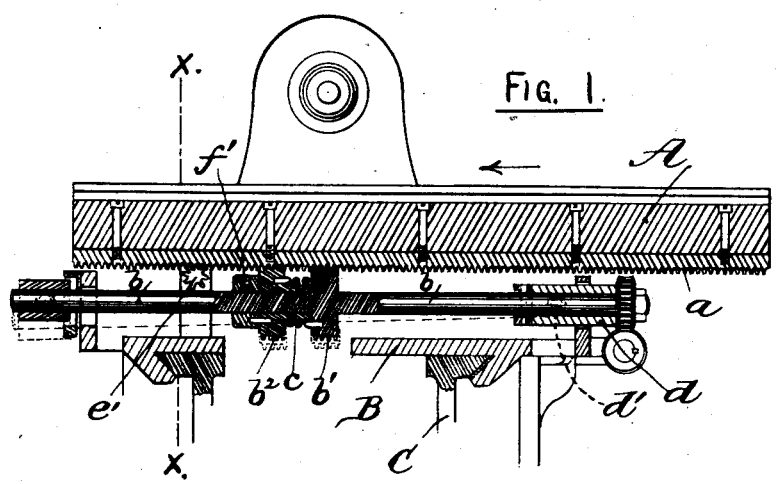

(No Model.)

E. H. PARKS.
MECHANISM FOR TAKING UP LOST MOTION.

No. 525,771. Patented Sept. 11, 1894.

WITNESSES:
S. J. Murphy.
John Henshaw.

INVENTOR
Edward H. Parks
by Wilmarth H. Thurston
Atty.

UNITED STATES PATENT OFFICE.

EDWARD H. PARKS, OF PROVIDENCE, RHODE ISLAND, ASSIGNOR TO THE BROWN & SHARPE MANUFACTURING COMPANY, OF SAME PLACE.

MECHANISM FOR TAKING UP LOST MOTION.

SPECIFICATION forming part of Letters Patent No. 525,771, dated September 11, 1894.

Application filed January 30, 1894. Serial No. 498,444. (No model.)

*To all whom it may concern:*

Be it known that I, EDWARD H. PARKS, of the city and county of Providence, in the State of Rhode Island, have invented certain new and useful Improvements in Mechanism for Taking Up Lost Motion; and I do hereby declare the following specification, taken in connection with the accompanying drawings, forming a part of the same, to be a full, clear, and exact description thereof.

My invention relates more particularly to taking up lost motion and preventing back-lash in a rack and worm feed, and is especially applicable for use in a machine, such as a milling machine for instance, in which a traveling work-supporting carriage is fed by means of a rack and worm to present the work held upon said carriage to the action of a rotary cutter or other revolving tool. In machines of this character either one of two methods of operating upon the work may be employed, that is to say, the revolving cutter may be revolved so that the motion of its under side will be in a direction opposite to that in which the carriage is moved in feeding the work, or it may be revolved so that the motion of its under side will be in the same direction as that in which the carriage is moved. In the first method, which has been the method most commonly employed heretofore, no provision for taking up lost motion or preventing back-lash is necessary, because the feed of the carriage and the thrust of the cutter are opposed to each other, but in the second method, and which in many cases is desirable to be employed, some provision for taking up lost motion and preventing back-lash in the feed of the carriage is required, and for the reason that the feed of the carriage and the thrust of the cutter are in the same direction, and consequently if no such provision were made the carriage and the work secured thereto would not be firmly held against the thrust of the cutter.

The object of the present invention is to provide means for taking up lost motion and preventing back-lash in a rack and worm feed, and particularly when such feed is employed to move the work-supporting carriage of a machine of the character referred to, whereby the machine may be employed for operating upon the work by the second of the two methods above referred to, in which the thrust of the cutter in operating upon the work is in the same direction as the feed of the carriage.

To that end the invention consists primarily in the combination, with a rack, of a worm-shaft provided with two worms for engaging said rack, one of said worms being rigidly secured to said shaft, and the other of said worms being loose on said shaft, and a torsion spring connected to said loose worm and tending to turn the same on said shaft.

The invention further consists in certain other combinations and arrangements of parts hereinafter described.

In the accompanying drawings I have shown the invention as applied to a worm and rack feed in a milling machine, in which said drawings—

Figure 2:
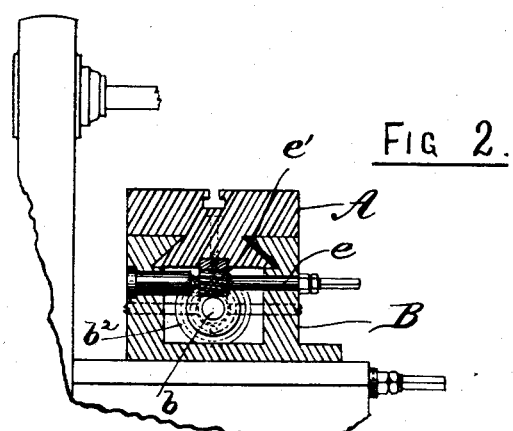
Figures 3, 4, 5:
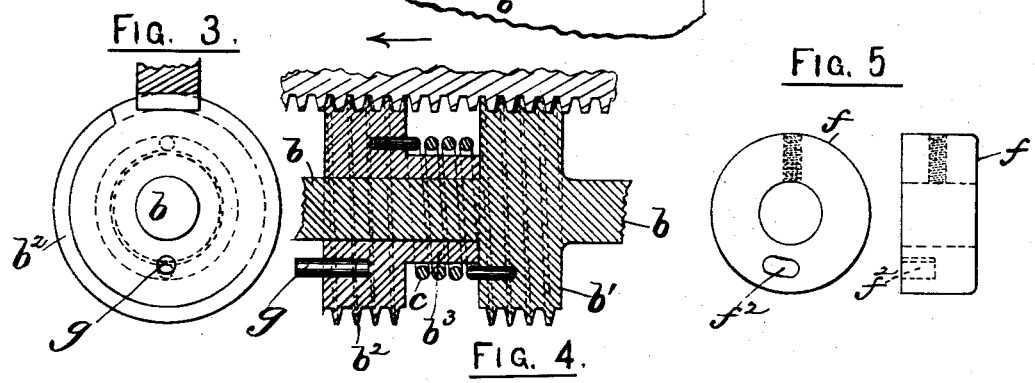

Figure 1 is a longitudinal section of a portion of a milling machine and so much of the mechanism for feeding the same as will be necessary for an understanding of the present invention. Fig. 2 is a transverse section on the line $x$, $x$, Fig. 1. Figs. 3, 4, and 5 are detailed views upon an enlarged scale, Fig. 3 being an end view of Fig. 4.

A represents the work-supporting carriage of a milling or other machine arranged to slide in ways upon a second carriage B, said last named carriage being in turn arranged to slide in ways upon the frame C in the usual manner. To the under side of the carriage A is secured the rack $a$. The worm-shaft $b$, which is to be revolved by any usual or suitable connection with the driving shaft of the machine, is provided with two worms $b'$ $b^2$, both of which engage with the rack $a$. The worm $b'$ is rigidly secured to the shaft $b$, but the worm $b^2$ is loose upon said shaft, and is preferably provided with an elongated hub $b^3$, as shown in the drawings. Surrounding the hub $b^3$ and connecting the worm $b^2$ with the worm $b'$, is a torsion spring $c$, the ends of the wire composing said spring being bent and inserted in holes formed one in each of said worms, as clearly shown in Figs. 1 and 4. Now with both of the worms $b'$, $b^2$ in engagement with the rack $a$, it is apparent that the torsion spring $c$ will tend to turn the loose worm $b^2$ on the shaft $b$, and if there be any play or lost motion between the teeth of the rack and the worms, it will serve to throw said loose worm in advance of the fixed worm $b'$ and thus take up such lost motion, as clearly shown in Fig. 4. If now power be applied to the worm-shaft $b$ to feed the rack in the direction of the arrow, Figs. 1 and 4, the fixed worm $b'$ will be revolved directly with said shaft, while the loose worm $b^2$ will be revolved by said shaft through the torsion spring $c$, said loose worm $b^2$ by the action of said torsion spring still continuing to take up any lost motion that there may be, while at the same time said loose worm $b^2$ will act as the device to move the rack in the direction of the arrow, the fixed worm $b'$ serving as a check to hold the rack against any thrust which may be brought upon it in the direction of its movement.

By the application of the rack and worm feed above described to the work carriage of a milling machine, the rotary cutter of said machine may be revolved in the same direction that said carriage is fed according to the second of the two methods above referred to, without any injurious consequences from lost motion or back-lash, which will be entirely prevented by the construction and arrangement of parts above described. As there would be a liability of the parts becoming cramped if the worm-shaft were revolved in the opposite direction with the worms in engagement with the rack, it is desirable when the carriage is to be returned to its original position to disengage the worms from the rack and to employ other means for returning the carriage. For this purpose the bearing $d$ for the shaft $b$ is journaled at $d'$, so that the opposite end of said shaft may be lowered to disengage the worms $b'$, $b^2$, from the rack $a$, as indicated in dotted lines, Fig. 1, when the carriage may be run back by means of the shaft $e$ and pinion $e'$ in a well understood manner.

In order to prevent the torsion spring $c$ from unwinding when the worms are disengaged from the rack, a collar $f$ is secured by a set-screw $f'$ to the shaft $b$ adjacent to the loose worm $b^2$. Said collar $f$ is provided with a slot or recess $f^2$ to receive the end of a pin $g$ secured to the loose worm $b^2$. The engagement of this pin $g$ with the end of the slot $f^2$ in the fixed collar $f$ limits the unwinding of the torsion spring $c$ and the consequent turning of the loose worm when disengaged from the rack.

While the employment of the mechanism above described in a milling machine permits the employment with said machine of the second of the two methods of operating upon the work above referred to, it does not in any way prevent or interfere with the use with said machine of the first of said methods. With the construction above described, involving the employment of a loose worm and the turning of the same under the action of a torsion spring, there will be a positive resistance to the thrust of the cutter, and at the same time all lost motion will be taken up, no matter in which direction the cutter be revolved, and consequently either of said two methods for operating upon the work may be employed, which is a great advantage, as in some kinds of work it may be desirable to employ one method, while in other kinds it may be desirable to employ the other.

What I claim as my invention, and desire to secure by Letters Patent, is—

1. The combination, with a rack, of a worm-shaft provided with two worms for engaging said rack, one of said worms being rigidly secured to said shaft, and the other of said worms being loose on said shaft, and a torsion spring connected to said loose worm and tending to turn the same on said shaft, substantially as described.

2. The combination, with a rack, of a worm-shaft provided with two worms for engaging said rack, one of said worms being rigidly secured to said shaft, and the other of said worms being loose on said shaft, a torsion spring connected to said loose worm and tending to turn the same on said shaft, and means for disengaging said worms from said rack, substantially as described.

3. The combination, with a rack, of a worm-shaft provided with two worms for engaging said rack, one of said worms being rigidly secured to said shaft, and the other of said worms being loose on said shaft, a torsion spring connected to said loose worm and tending to turn the same on said shaft, means for disengaging said worms from said rack, and means for limiting the turning of said loose worm when disengaged from said rack, substantially as described.

4. The combination, with the work-supporting carriage of a milling or other machine, of a rack secured to said carriage, a worm-shaft provided with two worms for engaging said rack, one of said worms being rigidly secured to said shaft, and the other of said worms being loose on said shaft, and a torsion spring connected to said loose worm and tending to turn the same on said shaft, substantially as described.

5. The combination, with the work-supporting carriage of a milling or other machine, of a rack secured to said carriage, a worm-shaft provided with two worms for engaging said rack, one of said worms being rigidly secured to said shaft and the other of said worms being loose on said shaft, a torsion spring connected to said loose worm and tending to turn the same on said shaft, means for disengaging said worms from said shaft, and means for running back said carriage, substantially as described.

EDWARD H. PARKS.

Witnesses:
W. H. THURSTON,
S. J. MURPHY.